United States Patent
Reznichenko et al.

(10) Patent No.: US 9,670,293 B2
(45) Date of Patent: Jun. 6, 2017

(54) SOLID SINGLE SITE CATALYSTS WITH HIGH POLYMERISATION ACTIVITY

(71) Applicant: BOREALIS AG, Vienna (AT)

(72) Inventors: Alexander Reznichenko, Helsinki (FI); Noureddine Ajellal, Helsinki (FI); Pascal Castro, Helsinki (FI); Irfan Saeed, Helsinki (FI)

(73) Assignee: BOREALIS AG, Vienna (AT)

( * ) Notice: Subject to any disclaimer, the term of this patent is extended or adjusted under 35 U.S.C. 154(b) by 0 days.

(21) Appl. No.: 14/914,501

(22) PCT Filed: Oct. 22, 2014

(86) PCT No.: PCT/EP2014/072651
§ 371 (c)(1),
(2) Date: Feb. 25, 2016

(87) PCT Pub. No.: WO2015/062936
PCT Pub. Date: May 7, 2015

(65) Prior Publication Data
US 2016/0200838 A1    Jul. 14, 2016

(30) Foreign Application Priority Data
Oct. 29, 2013    (EP) .................................... 13190748

(51) Int. Cl.
| C08F 4/649 | (2006.01) |
| C08F 4/6592 | (2006.01) |
| C08F 10/00 | (2006.01) |
| C08F 4/659 | (2006.01) |

(52) U.S. Cl.
CPC .............. *C08F 10/00* (2013.01); *C08F 4/649* (2013.01); *C08F 4/6592* (2013.01); *C08F 4/65912* (2013.01); *C08F 4/65925* (2013.01); *C08F 4/65927* (2013.01); *C08F 2410/01* (2013.01)

(58) Field of Classification Search
CPC ..... C08F 4/649; C08F 4/65912; C08F 4/6592
See application file for complete search history.

(56) References Cited

U.S. PATENT DOCUMENTS

| 4,107,414 A | 8/1978 | Giannini et al. |
| 4,186,107 A | 1/1980 | Wagner |
| 4,226,963 A | 10/1980 | Giannini et al. |
| 4,347,160 A | 8/1982 | Epstein et al. |
| 4,382,019 A | 5/1983 | Greco |
| 4,435,550 A | 3/1984 | Ueno et al. |
| 4,465,782 A | 8/1984 | McKenzie |
| 4,472,524 A | 9/1984 | Albizzati |
| 4,473,660 A | 9/1984 | Albizzati et al. |
| 4,522,930 A | 6/1985 | Albizzati et al. |
| 4,530,912 A | 7/1985 | Pullukat et al. |
| 4,532,313 A | 7/1985 | Matlack |
| 4,560,671 A | 12/1985 | Gross et al. |
| 4,581,342 A | 4/1986 | Johnson et al. |
| 4,657,882 A | 4/1987 | Karayannis et al. |
| 4,665,208 A | 5/1987 | Welborn, Jr. et al. |
| 4,874,734 A | 10/1989 | Kioka et al. |
| 4,908,463 A | 3/1990 | Bottelberghe |
| 4,924,018 A | 5/1990 | Bottelberghe |
| 4,952,540 A | 8/1990 | Kioka et al. |
| 4,968,827 A | 11/1990 | Davis |
| 5,091,352 A | 2/1992 | Kioka et al. |
| 5,103,031 A | 4/1992 | Smith, Jr. |
| 5,157,137 A | 10/1992 | Sangokoya |
| 5,204,419 A | 4/1993 | Tsutsui et al. |
| 5,206,199 A | 4/1993 | Kioka et al. |
| 5,235,081 A | 8/1993 | Sangokoya |
| 5,248,801 A | 9/1993 | Sangokoya |
| 5,308,815 A | 5/1994 | Sangokoya |
| 5,329,032 A | 7/1994 | Tran et al. |
| 5,391,529 A | 2/1995 | Sangokoya |
| 5,391,793 A | 2/1995 | Marks et al. |
| 5,504,172 A | 4/1996 | Imuta et al. |
| 5,529,850 A | 6/1996 | Morini et al. |
| 5,539,067 A | 7/1996 | Parodi et al. |
| 5,618,771 A | 4/1997 | Parodi et al. |
| 5,693,838 A | 12/1997 | Sangokoya et al. |
| 5,731,253 A | 3/1998 | Sangokoya |
| 5,731,451 A | 3/1998 | Smith et al. |

(Continued)

FOREIGN PATENT DOCUMENTS

| EP | 0 045 977 B1 | 1/1987 |
| EP | 0 260 130 A1 | 3/1988 |

(Continued)

OTHER PUBLICATIONS

"Glossary of Basic Terms in Polymer Science (IUPAC Recommendations 1996)," *Pure Appl. Chem.*, 68(8):1591-1595 (1996).
"MDO Film—Oriented PE and PP packaging film," IN0128/GB FF 2004 10, Borealis A/S (2004).
Atwood, "Chapter 6: Anionic and Cationic Organoaluminum Compounds," *Coord. Chem. Alum.*, VCH, New York, NY, pp. 197-232 (1993).
Britovsek et al., "The Search for New-Generation Olefin Polymerization Catalysts: Life beyond Metallocenes," *Angew. Chem, Int. Ed.*, vol. 38(4), pp. 428-447 (1999).
Busico et al., "Alk-1-ene Polymerization in the Presence of a Monocyclopentadienyl Zirconium(IV) Acetamidinate Catalyst: Microstructural and Mechanistic Insights[a]," *Macromol. Rapid Commun.* 28:1128-1134 (2007).

(Continued)

*Primary Examiner* — Caixia Lu
(74) *Attorney, Agent, or Firm* — Leydig, Voit & Mayer, Ltd.

(57) ABSTRACT

Process for the preparation of a solid catalyst system comprising the steps of preparing a liquid clathrate comprising a mixing of an aluminoxane, an aromatic compound and an organo-silicon compound, wherein the mol-ratio between the organo-silicon compound and aluminum of the aluminoxane is below 0.1, mixing said liquid clathrate with an organometallic compound obtaining a liquid mixture, and precipitating the solid catalyst system out of said liquid mixture by adding a saturated aliphatic compound to said mixture liquid.

12 Claims, 1 Drawing Sheet

(56) References Cited

U.S. PATENT DOCUMENTS

| | | | |
|---|---|---|---|
| 5,744,656 | A | 4/1998 | Askham |
| 6,316,562 | B1 | 11/2001 | Munck et al. |
| 6,586,528 | B1 | 7/2003 | Delaite et al. |
| 6,642,317 | B1 | 11/2003 | Delaite et al. |
| 7,342,078 | B2 | 3/2008 | Schottek et al. |
| 7,569,651 | B2 | 8/2009 | Schottek et al. |
| 2003/0149199 | A1 | 8/2003 | Schottek et al. |
| 2005/0187367 | A1 | 8/2005 | Hori et al. |
| 2006/0020096 | A1 | 1/2006 | Schottek et al. |
| 2006/0182987 | A1 | 8/2006 | Yu et al. |
| 2007/0235896 | A1 | 10/2007 | McLeod et al. |
| 2008/0214767 | A1 | 9/2008 | Mehta et al. |
| 2010/0081760 | A1 | 4/2010 | Rhee et al. |
| 2011/0031645 | A1 | 2/2011 | Kuettel et al. |

FOREIGN PATENT DOCUMENTS

| | | |
|---|---|---|
| EP | 0 279 586 A2 | 8/1988 |
| EP | 0 045 975 B1 | 4/1989 |
| EP | 0 045 976 B1 | 11/1989 |
| EP | 0 423 101 A2 | 4/1991 |
| EP | 0 491 566 A2 | 6/1992 |
| EP | 0 537 130 A1 | 4/1993 |
| EP | 0 561 476 A1 | 9/1993 |
| EP | 0 045 976 B2 | 12/1993 |
| EP | 0 594-218 A1 | 4/1994 |
| EP | 0 279 586 B1 | 5/1994 |
| EP | 0 622 380 A1 | 11/1994 |
| EP | 0 045 977 B2 | 3/1995 |
| EP | 0 586 390 B1 | 5/1997 |
| EP | 0 591 224 B1 | 2/1998 |
| EP | 0 887 379 A1 | 12/1998 |
| EP | 0 887 380 A1 | 12/1998 |
| EP | 0 887 381 A1 | 12/1998 |
| EP | 1 359 171 A1 | 11/2003 |
| EP | 1 376 516 A1 | 1/2004 |
| EP | 1 183 307 B1 | 7/2005 |
| EP | 0 991 684 B1 | 1/2006 |
| EP | 1 632 529 A1 | 3/2006 |
| EP | 1 448 622 B1 | 4/2006 |
| EP | 1 726 602 A1 | 11/2006 |
| EP | 1 741 725 A1 | 1/2007 |
| EP | 1 788 023 A1 | 5/2007 |
| EP | 1 892 264 A1 | 2/2008 |
| EP | 1 941 998 A1 | 7/2008 |
| EP | 2 075 284 A1 | 7/2009 |
| EP | 2 386 582 A1 | 11/2011 |
| EP | 2 386 583 A1 | 11/2011 |
| EP | 2 386 602 A1 | 11/2011 |
| EP | 2 038 346 B1 | 1/2012 |
| EP | 2 410 007 A1 | 1/2012 |
| EP | 2 423 257 A1 | 2/2012 |
| EP | 1 358 252 B1 | 4/2012 |
| EP | 2 532 687 A2 | 12/2012 |
| EP | 2 551 299 A1 | 1/2013 |
| EP | 2 565 221 A1 | 3/2013 |
| EP | 2 573 134 A1 | 3/2013 |
| EP | 2 592 112 A1 | 5/2013 |
| EP | 2 610 270 A1 | 7/2013 |
| EP | 2 610 271 A1 | 7/2013 |
| EP | 2 610 272 A1 | 7/2013 |
| EP | 2 610 273 A1 | 7/2013 |
| WO | WO 87/07620 A1 | 12/1987 |
| WO | WO 92/12182 A1 | 7/1992 |
| WO | WO 92/13029 A1 | 8/1992 |
| WO | WO 92/19653 A1 | 11/1992 |
| WO | WO 92/19658 A1 | 11/1992 |
| WO | WO 92/19659 A1 | 11/1992 |
| WO | WO 92/21705 A1 | 12/1992 |
| WO | WO 93/11165 A1 | 6/1993 |
| WO | WO 93/11166 A1 | 6/1993 |
| WO | WO 93/19100 A1 | 9/1993 |
| WO | WO 94/10180 A1 | 5/1994 |
| WO | WO 94/14856 A1 | 7/1994 |
| WO | WO 95/12622 A1 | 5/1995 |
| WO | WO 95/32994 A1 | 12/1995 |
| WO | WO 97/10248 A1 | 3/1997 |
| WO | WO 97/14700 A1 | 4/1997 |
| WO | WO 97/28170 A1 | 8/1997 |
| WO | WO 97/36939 A1 | 10/1997 |
| WO | WO 98/12234 A1 | 3/1998 |
| WO | WO 98/38041 A1 | 9/1998 |
| WO | WO 98/40331 A1 | 9/1998 |
| WO | WO 98/46616 A1 | 10/1998 |
| WO | WO 98/47929 A1 | 10/1998 |
| WO | WO 98/49208 A1 | 11/1998 |
| WO | WO 98/56831 A1 | 12/1998 |
| WO | WO 98/58976 A1 | 12/1998 |
| WO | WO 99/10353 A1 | 3/1999 |
| WO | WO 99/12981 A1 | 3/1999 |
| WO | WO 99/19335 A1 | 4/1999 |
| WO | WO 99/24478 A1 | 5/1999 |
| WO | WO 99/24479 A1 | 5/1999 |
| WO | WO 99/33842 A1 | 7/1999 |
| WO | WO 99/41290 A1 | 8/1999 |
| WO | WO 00/34341 A1 | 6/2000 |
| WO | WO 00/68315 A1 | 11/2000 |
| WO | WO 01/48034 A2 | 7/2001 |
| WO | WO 01/58970 A1 | 8/2001 |
| WO | WO 01/70395 A2 | 9/2001 |
| WO | WO 02/02576 A1 | 1/2002 |
| WO | WO 02/051912 A1 | 7/2002 |
| WO | WO 02/057342 A2 | 7/2002 |
| WO | WO 03/000754 A1 | 1/2003 |
| WO | WO 03/000755 A2 | 1/2003 |
| WO | WO 03/000756 A2 | 1/2003 |
| WO | WO 03/000757 A1 | 1/2003 |
| WO | WO 03/051934 A2 | 6/2003 |
| WO | WO 03/082879 A1 | 10/2003 |
| WO | WO 2004/000899 A1 | 12/2003 |
| WO | WO 2004/029112 A1 | 4/2004 |
| WO | WO 2004/111095 A1 | 12/2004 |
| WO | WO 2005/105863 A2 | 11/2005 |
| WO | WO 2006/069733 A1 | 7/2006 |
| WO | WO 2003/066698 A1 | 8/2006 |
| WO | WO 2006/086134 A1 | 8/2006 |
| WO | WO 2006/097497 A1 | 9/2006 |
| WO | WO 2007/107448 A1 | 9/2007 |
| WO | WO 2007/116034 A1 | 10/2007 |
| WO | WO 2007/122239 A1 | 11/2007 |
| WO | WO 2007/137853 A1 | 12/2007 |
| WO | WO 2008/034630 A1 | 3/2008 |
| WO | WO 2009/027075 A2 | 3/2009 |
| WO | WO 2009/054832 A1 | 4/2009 |
| WO | WO 2009/063819 A1 | 5/2009 |
| WO | WO 2010/009827 A1 | 1/2010 |
| WO | WO 2010/039715 A1 | 4/2010 |
| WO | WO 2010/052260 A1 | 5/2010 |
| WO | WO 2010/053644 A1 | 5/2010 |
| WO | WO 2010/082943 A1 | 7/2010 |
| WO | WO 2010/142540 A1 | 12/2010 |
| WO | WO 2011/023594 A1 | 3/2011 |
| WO | WO 2011/039305 A1 | 4/2011 |
| WO | WO 2011/135004 A2 | 11/2011 |
| WO | WO 2011/135005 A2 | 11/2011 |
| WO | WO 2011/138211 A1 | 11/2011 |
| WO | WO 2011/160936 A1 | 12/2011 |
| WO | WO 2012/001052 A2 | 1/2012 |
| WO | WO 2012/007430 A1 | 1/2012 |
| WO | WO 2012/093098 A1 | 7/2012 |
| WO | WO 2013/007650 A1 | 1/2013 |
| WO | WO 2013/127707 A1 | 9/2013 |
| WO | WO 2014/023603 A1 | 2/2014 |
| WO | WO 2014/023604 A1 | 2/2014 |
| WO | WO 2015/022127 A1 | 2/2015 |
| WO | WO 2015/024887 A1 | 2/2015 |
| WO | WO 2015/024891 A1 | 2/2015 |
| WO | WO 2015/044116 A1 | 4/2015 |
| WO | WO 2015/052246 A1 | 4/2015 |
| WO | WO 2015/059229 A1 | 4/2015 |
| WO | WO 2015/059230 A1 | 4/2015 |
| WO | WO 2015/062936 A1 | 5/2015 |

(56) References Cited

FOREIGN PATENT DOCUMENTS

| WO | WO 2015/075088 A1 | 5/2015 |
| WO | WO 2015/082379 A1 | 6/2015 |
| WO | WO 2015/091839 A1 | 6/2015 |

OTHER PUBLICATIONS

Busico et al., "Full Assignment of the $^{13}$C NMR Spectra of Regioregular Polypropylenes: Methyl and Methylene Region," *Macromolecules* 30:6251-6263 (1997).

Busico et al., "Microstructure of polypropylene," *Prog. Polym. Sci.* 26:443-533 (2001).

Castignolles et al., "Detection and quantification of branching in polyacrylates by size-exclusion chromatography (SEC) and melt-state $^{13}$C NMR spectroscopy," *Polymer*, 50(11):2373-2383, (2009).

Cheng, "$^{13}$C NMR Analysis of Ethylene-Propylene Rubbers," *Macromolecules* 17:1950-1955 (1984).

Filip et al., "Heteronuclear decoupling under fast MAS by a rotor-synchronized Hahn-echo pulse train," *J. Magnet. Reson.* 176:239-243 (2005).

Gahleitner et al., "Nucleation of Polypropylene Homo- and Copolymers," *International Polymer Processing* 26(1):2-20 (2011).

Grein et al., "Impact Modified Isotatic Polypropylene with Controlled Rubber Intrinsic Viscosities: Some New Aspects About Morphology and Fracture," *J. Appl. Polymer Sci.*, 87:1702-1712 (2003).

Griffin et al., "Low-load rotor-synchronised Hahn-echo pulse train (RS-HEPT) $^1$H decoupling in solid-state NMR: factors affecting MAS spin-echo dephasing times," *Magn. Reson. Chem.* 45:S198-S208 (2007).

Holbrey et al., "Liquid clathrate formation in ionic liquid-aromatic mixtures," *Chem. Comm.*, 2003, pp. 476-477.

Kakugo et al., "$^{13}$C NMR Determination of Monomer Sequence Distribution in Ethylene-Propylene Copolymers Prepared with σ-TiCl$_3$-Al(C$_2$H$_5$)$_2$Cl," *Macromolecules* 15:1150-1152 (1982).

Klimke et al., "Optimisation and Application of Polyolefin Branch Quantification by Melt-State $^{13}$C NMR Spectroscopy," *Macromol. Chem. Phys.* 207(4):382-395 (2006).

McAuley et al., "On-line Inference of Polymer Properties in an Industrial Polyethylene Reactor," *AIChE Journal*, vol. 37, No. 6, pp. 825-835 (1991).

Myhre et al., "Oriented PE films—Expanding Opportunities with Borstar® PE," Maack Speciality Films, pp. 1-10 (2001).

Parkinson et al., "Effect of Branch Length on $^{13}$C NMR Relaxation Properties in Molten Poly[ethylene-co-(α-olefin)] Model Systems," *Macromol. Chem. Phys.* 208(19-20):2128-2133 (2007).

Periodic Table (IUPAC 2007).

*Plastics Additives Handbook*, 5th edition, Hans Zweifel, Editor, Hanser Publishers, Munich, pp. 871-873 (2001).

*Plastics Additives Handbook*, 5th edition, Hans Zweifel, Editor, Hanser Publishers, Munich, pp. 956-965 (2001).

Pollard et al., "Observation of Chain Branching in Polyethylene in the Solid State and Melt via 13C NMR Spectroscopy and Melt NMR Relaxation Time Measurements," *Macromolecules*, 37(3):813-825 (2004).

*Propylene Handbook*, 2$^{nd}$ Edition, Chapter 7.2.2 "Oriented Films," pp. 405-415, Nello Pasquini, Editor, Hanser (2005).

Randall, "A Review of High Resolution Liquid $^{13}$Carbon Nuclear Magnetic Resonance Characterizations of Ethylene-Based Polymers," *JMS-Rev. Macromol. Chem. Phys.*, C29(2 & 3):201-317 (1989).

Resconi et al., "Diastereoselective Synthesis, Molecular Structure, and Solution Dynamics of meso- and rac-[Ethylenebis(4,7-dimethyl-η5-1-indenyl)]zirconium Dichloride Isomers and Chain Transfer Reactions in Propene Polymerization with the rac Isomer," *Organometallics* 15(23):5046-5059 (1996).

Resconi et al., "Highly Regiospecific Zirconocene Catalysts for the Isospecific Polymerization of Propene," *JACS* 120(10):2308-2321 (1998).

Resconi et al., "Selectivity in Propene Polymerization with Metallocene Catalysts," *Chem. Rev.* 100(4):1253-1345 (2000).

Singh et al., "Triad sequence determination of ethylene-propylene copolymers—application of quantitative $^{13}$C NMR," *Polymer Testing* 28(5):475-479 (2009).

Spaleck et al., "The Influence of Aromatic Substituents on the Polymerization Behavior of Bridged Zirconocene Catalysts," *Organometallics* 13:954-963 (1994).

Spear et al., "Liquid Clathrates," *Encyclopedia of Supramolecular Chemistry*, J.L. Atwood and J.W. Steed (Eds.); Marcel Dekker: New York, pp. 804-808 (2004).

Wang et al., "Structural Analysis of Ethylene/Propylene Copolymers Synthesized with a Constrained Geometry Catalyst," *Macromolecules* 33:1157-1162 (2000).

Zhou et al., "A new decoupling method for accurate quantification of polyethylene copolymer composition and triad sequence distribution with $^{13}$C NMR," *J. Magnet. Reson.* 187:225-233 (2007).

European Patent Office, International Search Report in International Application No. PCT/EP2014/072651 (Jan. 20, 2015).

European Patent Office, Written Opinion in International Application No. PCT/EP2014/072651 (Jan. 20, 2015).

European Patent Office, International Preliminary Report on Patentability in International Application No. PCT/EP2014/072651 (Oct. 12, 2015).

European Patent Office, Extended European Search Report in European Patent Application No. 13190748.7 (Apr. 25, 2014).

U.S. Appl. No. 14/911,295, filed Feb. 10, 2016.
U.S. Appl. No. 14/911,300, filed Feb. 10, 2016.
U.S. Appl. No. 14/911,299, filed Feb. 10, 2016.
U.S. Appl. No. 15/022,671, filed Mar. 17, 2016.
U.S. Appl. No. 15/030,556, filed Apr. 19, 2016.
U.S. Appl. No. 15/022,664, filed Mar. 17, 2016.
U.S. Appl. No. 15/029,493, filed Apr. 14, 2016.
U.S. Appl. No. 15/027,129, filed Apr. 4, 2016.
U.S. Appl. No. 15/101,837, filed Jun. 3, 2016.
U.S. Appl. No. 15/039,107, filed May 25, 2016.
U.S. Appl. No. 15/103,744, filed Jun. 10, 2016.
U.S. Appl. No. 15/103,783, filed Jun. 10, 2016.

SOLID SINGLE SITE CATALYSTS WITH HIGH POLYMERISATION ACTIVITY

CROSS-REFERENCE TO RELATED APPLICATIONS

This patent application is the U.S. national phase of International Application No. PCT/EP2014/072651, filed on Oct. 22, 2014, which claims the benefit of European Patent Application No. 13190748.7, filed Oct. 29, 2013, the disclosures of which are incorporated herein by reference in their entireties for all purposes.

The present invention is directed to a new method for preparing a solid catalyst system enabling the efficient preparation of polymers. Furthermore, the present invention is directed at a solid catalyst system obtainable, preferably obtained from the inventive method.

In the field of catalysts since many years great efforts are undertaken to further improve the catalyst types tailored for specific purposes. For instance in polymerisation processes single site, like metallocene, catalyst systems are widely used having many advantages.

At the beginning of the development of new metallocene catalyst systems only homogeneous catalyst systems were available. Such homogeneous catalyst systems are solutions of one or more catalyst components, e.g. a transition metal compound and optionally a cocatalyst. Homogeneous systems are used as liquids in the polymerisation process. Such systems have in general a satisfactory catalytic activity, but their problem has been that the polymer thus produced has a poor morphology (e.g. the polymer obtained is in a form of a fluff having a low bulk density). As a consequence, operation of slurry and gas phase reactors using a homogeneous catalyst system causes problems in practice, for instance in terms of reactor fouling.

To overcome the problems of the homogeneous catalyst systems, supported systems have been developed. These supported systems, known as heterogeneous catalyst systems, comprise carrier materials, such as porous organic and inorganic support materials, like silica, aluminoxane or porous polymeric materials onto which the catalyst is loaded or supported.

However, also supported catalyst systems cause problems. To mention only one among many, it is difficult to get an even distribution of the catalyst components in the porous carrier material. Further leaching of the catalyst components from the support can occur. Such drawbacks lead to an unsatisfactory polymerisation behavior of the catalyst, and as a result, the morphology of the polymer product thus obtained is also poor. Further such classic heterogeneous catalyst systems show reduced catalytic activity, which is of course detrimental, as the catalyst amount must be increased, which in turn leads to polymer products contaminated with rather high amounts of catalyst residues including silica residues, which might be very detrimental in some product applications.

For this reason a new single site, like metallocene catalyst system has been developed which significantly reduces the drawbacks of the known heterogeneous catalyst systems. Such new catalyst systems are solid catalyst systems, but are not in need of catalytically inert support material, and are further featured by spherical particles with low porosity. Such new metallocene catalyst systems enable to increase the output rate of polymers, since the bulk density of the polymerised product can be increased. For the first time such new metallocene catalyst systems have been described in WO 03/051934. These types of catalysts have solved many problems caused by catalysts of earlier prior art.

Many prior art catalysts have, however, a general drawback relating to their tendency to dissolve in the polymerisation medium, and thus causing undesired fouling in the reactors. Thus, there remains still some work to do to improve the properties of the catalyst, especially in view of morphology and in that the desired morphology would remain and be effectively used, during the polymerisation, which would also decrease fouling and sheeting problems Moreover, nowadays the catalyst shall be not only suitable for specific processes for producing desired polymers but there is a general tendency to find out methods, also in catalyst preparation field, where the starting materials are safer and easier to be used both in environmental as well handling point of view. Thus there is the strong need to develop preparation methods of such catalyst systems based on materials which promote sustainable preparation method as well as are easily commercially accessible and thus well priced.

Much effort has been put into improving the methods for preparing support-free metallocene catalyst as described in WO 03/051934. Most research since has been focused at improving the emulsification/solidification technology in which an emulsion is formed wherein the continuous phase, in which a solution of the catalyst components forms the dispersed phase in the form of droplets, is immiscible with said catalyst component solution.

WO 2011/138211 describes an improved and suitable process for preparing solid metallocene catalyst systems with the emulsion/solidification technology, in which a liquid clathrate constitutes the dispersed phase of the emulsion and the solvent used for the continuous phase of the emulsion is a non-reactive fluorinated synthetic oil.

Unfortunately such catalyst systems, prepared by the emulsification/solidification technology comprising a metallocene catalyst in combination with an aluminoxane co-catalyst, have also some disadvantages, even when having the dispersed phase in form of a liquid clathrate.

For example, such catalyst systems have a tendency to dissolve to some extent in common polymerisation media. The solubility can lead to catalyst leaching, which is further associated with reactor fouling and sheeting.

Recently it has been found that support-free catalyst systems comprising a metallocene catalyst in combination with an aluminoxane co-catalyst can be obtained from a solution without applying the emulsion/solidification technology. EP 2 386 582 A1 describes a process in which a solid catalyst is obtained from preparing a liquid clathrate from aluminoxane, organometallic compound (metallocene) and a compound being able to form lattice with aluminoxane and metallocene, and a hydrocarbon compound, and subsequent precipitation. The compound being able to form lattice with aluminoxane and metallocene is said to be either M-X compound or an organosilicon compound, and precipitation is carried out with silicon oil. From this precipitation technology, solid catalyst particles could be obtained with improved leaching properties, however, this approach resulted in solid catalyst particles with lower catalytic activity compared to similar solid catalyst particles obtained by the emulsion/solidification technology. In this respect exceptionally low catalytic activities in propylene polymerisation could be observed, in particular when catalysts were prepared in presence of siloxanes.

Thus the object of the present invention is to find an improved and suitable process for the manufacture of solid catalyst systems without the need of external support materials, and which render possible to produce polymers in an efficient manner, i.e. using solid catalyst systems which are less soluble in the polymerisation media, and are obtained by a reliable process yielding catalyst systems with high catalytic activities towards olefins such as propylene and ethylene, in particular towards propylene.

The finding of the present invention is that the solid catalyst system must be produced by preparing first a liquid clathrate of activator and clathrating agent using a specific ratio with respect to clathrating agent and activator, and after that forming a liquid mixture of said liquid clathrate and an organometallic compound, which liquid mixture is converted into solid form by precipitation using specified precipitation agent.

Thus the present invention is directed to a process for the preparation of a solid catalyst system (CS) comprising the steps of
(i) preparing a liquid clathrate (LC) comprising a mixing step of an aluminoxane (A), an aromatic compound (AC) and an organo-silicon compound (OS), wherein the mol-ratio between the organo-silicon compound (OS) and aluminum (Al) of the aluminoxane (A) [(OS)/(Al)] is equal or below 0.1,
(ii) mixing said liquid clathrate (LC) with an organometallic compound (C) obtaining a liquid mixture (MI),
(iii) precipitating the solid catalyst system (CS) out of said liquid mixture (MI) by adding a saturated aliphatic compound to said mixture (MI)
(iv) optionally recovering particles of the solid catalyst system (CS),
wherein preferably during the process no carrier material, i.e. no external catalytically inert support material, is added.

Surprisingly it has been found out that with the above defined process in an effective manner solid catalyst systems (CS) can be obtained, which enables a person skilled in the art to efficiently produce polymers having good morphology and with acceptable activity. The process of the invention is easy to control due to the separate process steps for producing liquid clathrate (LC) and further liquid catalyst mixture (MI) as well due to the improved precipitation step. When applying said solid catalyst systems (CS) in polymerisation processes, high catalytic activities could be observed without the occurrence of reactor fouling.

The solid catalyst system (CS) obtained according to the instant process is solid without external catalytically inert support material.

External catalytically inert support material according to this invention is any material which is used to decrease solubility of the catalyst systems in media which are generally used in polymerization processes. Of course such material has no catalitical activity, especially in the polymerization process, like in a polyolefin polymerization process, e.g. in a polyethylene or polypropylene polymerization process. Accordingly said external catalytically inert support material is a material which effectively decreases solubility in common polymerization media. Typical external catalytically inert support materials are organic and inorganic support materials, like silica, solid aluminoxane or porous polymeric materials, onto which catalyst components are loaded. These support materials are generally used in amounts of at least 50 wt.-%, more preferably of at least 70.0 wt.-%. Accordingly in the inventive process rather low amount of external catalytically inert support material is used (if used at all). Preferably the amount of external catalytically inert support material used in the process is below 10.0 wt.-%, more preferably below 5.0 wt.-%, yet more preferably no external catalytically inert support mate-rial used. Accordingly the amount of such external catalytically inert support material within the obtained solid catalyst system (CS) is below 10.0 wt.-%, yet more preferably below 5.0 wt.-%, yet more preferably not detectable, like not present.

Throughout the invention the terms "external catalytically inert support material" and "carrier material" are interchangeable.

Furthermore, it has been found that the activity decreasing effect of the clathrating agent (OS) can be compensated when the ratio between the clathrating agent (OS) and aluminoxane (A) is carefully controlled.

Further, using saturated hydrocarbon compound instead of silicone fluid in precipitation step shows a clear benefit in activity of the catalyst.

The organometallic compound (C) preferably comprises a transition metal (M) of group 3 to 10 of the Periodic Table (IUPAC 2007) or of an actinide or lanthanide.

The term "an organometallic compound (C)" in accordance with the present invention preferably includes any metallocene or non-metallocene compound of a transition metal which bears at least one organic (coordination) ligand and exhibits the catalytic activity alone or together with a cocatalyst. The transition metal compounds are well known in the art and the present invention covers compounds of metals from group 3 to 10, e.g. group 3 to 7, or 3 to 6, such as group 4 to 6 of the Periodic Table, (IUPAC 2007), as well as lanthanides or actinides.

In one embodiment the organometallic compound (C) has the following formula (I):

$$(L)_m R_n MX_q \qquad (I)$$

wherein
"M" is a transition metal (M) of group 3 to 10 of the Periodic Table (IUPAC 2007),
each "X" is independently a mono anionic ligand, such as a σ-ligand,
each "L" is independently an organic ligand which coordinates to the transition metal "M",
"R" is a bridging group linking said organic ligands (L),
"m" is 1, 2 or 3, preferably 2,
"n" is 0, 1 or 2, preferably 1,
"q" is 1, 2 or 3, preferably 2, and
m+q is equal to the valency of the transition metal (M).

"M" is preferably selected from the group consisting of zirconium (Zr), hafnium (Hf), or titanium (Ti), more preferably selected from the group consisting of zirconium (Zr) and hafnium (Hf).

In a more preferred definition, each organic ligand (L) is independently
(a) a substituted or unsubstituted cyclopentadienyl or a bi- or multicyclic derivative of a cyclopentadienyl which optionally bear further substituents and/or one or more hetero ring atoms from a group 13 to 16 of the Periodic Table (IUPAC 2007); or
(b) an acyclic $\eta^1$- to $\eta^4$- or $\eta^6$-ligand composed of atoms from groups 13 to 16 of the Periodic Table, and in which the open chain ligand may be fused with one or two, preferably two, aromatic or non-aromatic rings and/or bear further substituents; or
(c) a cyclic $\eta^1$- to $\eta^4$- or $\eta^6$-, mono-, bi- or multidentate ligand composed of unsubstituted or substituted mono-, bi- or multicyclic ring systems selected from aromatic or non-aromatic or partially saturated ring systems, such ring systems containing optionally one or more heteroatoms selected from groups 15 and 16 of the Periodic Table (IUPAC 2007).

Organometallic compounds (C), preferably used in the present invention, have at least one organic ligand (L) belonging to the group (a) above. Such organometallic compounds are called metallocenes.

More preferably at least one of the organic ligands (L) belonging to group (a), preferably both organic ligands (L), is (are) selected from the group consisting of cyclopentadienyl, indenyl, tetrahydroindenyl, fluorenyl, which can be independently substituted or unsubstituted. Further, in case said organic ligands (L) are substituted it is preferred that at least one organic ligand (L), preferably both organic ligands (L), comprise one or more substituents independently selected from $C_1$ to $C_{20}$ hydrocarbyl or silyl groups, which optionally contain one or more heteroatoms selected from groups 14 to 16 and/or are optionally substituted by halogen atom(s), The term $C_1$ to $C_{20}$ hydrocarbyl group, whenever used in the present application, includes $C_1$ to $C_{20}$ alkyl, $C_2$ to $C_{20}$ alkenyl, $C_2$ to $C_{20}$ alkynyl, $C_3$ to $C_{20}$ cycloalkyl, $C_3$ to $C_{20}$ cycloalkenyl, $C_6$ to $C_{20}$ aryl, $C_7$ to $C_{20}$ alkylaryl or $C_7$ to $C_{20}$ arylalkyl groups or mixtures of these groups such as cycloalkyl substituted by alkyl.

Further, two substituents, which can be same or different, attached to adjacent C-atoms of a ring of the ligands (L) can also taken together form a further mono or multicyclic ring fused to the ring.

Preferred hydrocarbyl groups are independently selected from linear or branched $C_1$ to $C_{10}$ alkyl groups, optionally interrupted by one or more heteroatoms of groups 14 to 16, like O, N or S, and substituted or unsubstituted $C_6$ to $C_{20}$ aryl groups.

Linear or branched $C_1$ to $C_{10}$ alkyl groups, optionally interrupted by one or more heteroatoms of groups 14 to 16, are more preferably selected from methyl, ethyl, propyl, isopropyl, tertbutyl, isobutyl, $C_{5-6}$ cycloalkyl, OR, SR, where R is $C_1$ to $C_{10}$ alkyl group, $C_6$ to $C_{20}$ aryl groups are more preferably phenyl groups, optionally substituted with 1 or 2 $C_1$ to $C_{10}$ alkyl groups as defined above.

By "σ-ligand" is meant throughout the invention a group bonded to the transition metal (M) via a sigma bond.

Further, the ligands "X" are preferably independently selected from the group consisting of hydrogen, halogen, $C_1$ to $C_{20}$ alkyl, $C_1$ to $C_{20}$ alkoxy, $C_2$ to $C_{20}$ alkenyl, $C_2$ to $C_{20}$ alkynyl, $C_3$ to $C_{12}$ cycloalkyl, $C_6$ to $C_{20}$ aryl, $C_6$ to $C_{20}$ aryloxy, $C_7$ to $C_{20}$ arylalkyl, $C_7$ to $C_{20}$ arylalkenyl, —SR", —PR"$_3$, —SiR"$_3$, —OSiR"$_3$ and —NR"$_2$, wherein each R" is independently hydrogen, $C_1$ to $C_{20}$ alkyl, $C_2$ to $C_{20}$ alkenyl, $C_2$ to $C_{20}$ alkynyl, $C_3$ to $C_{12}$ cycloalkyl or $C_6$ to $C_{20}$ aryl.

More preferably "X" ligands are selected from halogen, $C_1$ to $C_6$ alkyl, $C_5$ to $C_6$ cycloalkyl, $C_1$ to $C_6$ alkoxy, phenyl and benzyl groups.

The bridging group "R" may be a divalent bridge, preferably selected from —R'$_2$C—, —R'$_2$C—CR'$_2$—, —R'$_2$Si—, —R'$_2$Si—SiR'$_2$—, —R'$_2$Ge—, wherein each R' is independently a hydrogen atom, $C_1$ to $C_{20}$ alkyl, $C_2$ to $C_{10}$ cycloalkyl, tri($C_1$ to $C_{20}$ alkyl)silyl, $C_6$ to $C_{20}$ aryl, $C_7$ to $C_{20}$ arylalkyl and $C_7$ to $C_{20}$ to alkylaryl.

More preferably the bridging group "R" is a divalent bridge selected from —R'$_2$C—, —R'$_2$Si—, wherein each R' is independently a hydrogen atom, $C_1$ to $C_{20}$ alkyl, $C_2$ to $C_{10}$ cycloalkyl, $C_6$ to $C_{20}$ aryl, $C_7$ to $C_{20}$ arylalkyl and $C_7$ to $C_{20}$ alkylaryl.

Another subgroup of the organometallic compounds (C) of formula (I) is known as non-metallocenes wherein the transition metal (M), preferably a Group 4 to 6 transition metal, suitably Ti, Zr or Hf, has a coordination ligand other than a cyclopentadienyl ligand. The term "non-metallocene" used herein means compounds, which bear no cyclopentadienyl ligands or fused derivatives thereof, but one or more non-cyclopentadienyl η-, or σ-, mono-, bi- or multidentate ligand. Such ligands can be chosen e.g. from the groups (b) and (c) as defined above and described e.g. in WO 01/70395, WO 97/10248, WO 99/41290, and WO 99/10353), and further in V. C. Gibson et al., in Angew. Chem. Int. Ed., engl., vol 38, 1999, pp 428 447, the disclosures of which are incorporated herein by reference.

However, the organometallic compound (C) of the present invention is preferably a metallocene as defined above.

Metallocenes are described in numerous patents. In the following just a few examples are listed; EP 260 130, WO 97/28170, WO 98/46616, WO 98/49208, WO 98/040331, WO 99/12981, WO 99/19335, WO 98/56831, WO 00/34341, WO00/148034, EP 423 101, EP 537 130, WO2002/02576, WO2005/105863, WO 2006097497, WO2007/116034, WO2007/107448, WO2009/027075, WO2009/054832, WO 2012/001052 and EP 2532687, the disclosures of which are incorporated herein by reference. Further, metallocenes are described widely in academic and scientific articles.

In the following the essential features of the present invention are described in more detail.

The present invention is directed at a process for the preparation of a solid catalyst system (CS) comprising the steps of (i) preparing a liquid clathrate (LC) comprising a mixing step of an aluminoxane (A), an aromatic compound (AC) and an organo-silicon compound (OS), wherein the mol-ratio between the organo-silicon compound (OS) and aluminum (Al) of the aluminoxane (A) [(OS)/(Al)] is below 0.1, (ii) mixing said liquid clathrate (LC) with an organometallic compound (C) obtaining a liquid mixture (MI), said organometallic compound (C) is of formula (I)

$$(L)_m R_n MX_q \quad (I)$$

wherein

"M" is a transition metal (M) of group 3 to 10 of the Periodic Table (IUPAC 2007), each "X" is independently a monoanionic ligand, such as σ-ligand, each "L" is independently an organic ligand which coordinates to the transition metal (M), "R" is a bridging group linking said organic ligands (L), "m" is 2 or 3, preferably 2, "n" is 0, 1 or 2, preferably 1, "q" is 1, 2 or 3, preferably 2, m+q is equal to the valency of the transition metal (M), (iii) precipitating the solid catalyst system (CS) by adding a saturated aliphatic compound to said liquid mixture (MI)

(iv) optionally recovering particles to obtain the solid catalyst system (CS).

According to the invention first step (step (i)) is followed by the second step (step (ii)). In other words, a liquid mixture (MI) is produced by preparing a liquid clathrate (LC) and subsequently mixing said liquid clathrate (LC) with an organometallic compound (C). Accordingly the liquid clathrate (LC) is not treated any further before being mixed with an organometallic compound (C). Further it is preferred that the liquid clathrate (LC) is a solution according to the definition of this invention. By "not treated" is meant that no such actions are carried, which might change either the physical or chemical composition of the liquid clathrate (LC) of step (i). However, e.g. washing or storing, where no such changes happen is possible between the steps (i) and (ii), if needed.

According to the invention step (ii) is followed by step (iii). In other words, in step (ii) a liquid mixture (MI) is produced and said liquid mixture (MI) is then in step (iii) precipitated. Accordingly the requirement that step (iii) must subsequently follow step (ii) may allow the storage of the liquid mixture (MI), but does not encompass embodiments in which the liquid mixture (MI) is further treated in a way that any physical or chemical changes occur in the liquid mixture (MI). Further it is preferred that the liquid mixture (MI) itself is homogenous, i.e. is a solution according to the definition of the invention.

The term "mixture" throughout the present application indicates that two or more substances are present.

The term "solution" throughout the present application indicates that two or more substances are homogenously mixed, e.g. is not a two phase system.

An "emulsion" according to this invention is a mixture of two liquid substances. One substance, the dispersed phase, is dispersed in the other substance, the continuous phase, as droplets.

The term "liquid" according to this invention indicates that a compound (including a liquid) is liquid by normal pressure (1 atm) at room temperature, e.g. 20 to 30° C.

A "liquid clathrate" is according to this invention a liquid which comprises, preferably consists of, a lattice (L), i.e. the reaction product of aluminoxane (A) the organo-silicon compound (OS) and a guest (G) enclosed therein. Liquid clathrates are as such well known and for instance described by Atwood, Jerry L. Dep. Chem., Univ. Alabama, Tuscaloosa, Ala., USA. Editor(s): Robinson, Gregory Heagward.; Coord. Chem. Alum. (1993), p. 197-32. Publisher: VCH, New York, N.Y. CODEN: 59ECAI Conference; General Review written in English. CAN 119:117290; John D. Holbrey, "Liquid clathrate formation in ionic liquid-aromatic mixtures", Chem. Commun., 2003, pages 476 to 477, and Scott K. Spear, Encyclopedia of Supramolecular Chemistry, 2001, pages 804 to 807. Accordingly the "liquid clathrate (LC)" is preferably a liquid in which the lattice (L) constitutes the superstructure wherein the guest (G) is embedded. Preferably the guest (G) stabilizes said superstructure. The guest (G) according to this invention is the aromatic compound (AC).

A benefit of the solid catalyst system (CS) of the present invention over the metallocene/MAO based catalysts of prior art is the low solubility in solvents, including solvents used in polymerisation. The liquid clathrate (LC) is more stable than traditional catalyst/co-catalyst structures and thus is less soluble in common media for olefin polymerisation.

Thus one essential aspect of the invention is that the solid catalyst system (CS) is obtained by the use of a liquid clathrate (LC).

The liquid clathrate (LC) of the present invention comprises
(a) a lattice (L) being the reaction product of
(a1) aluminoxane (A) and
(a2) an organo-silicon compound (OS) being effective to form with the aluminoxane (A) the lattice (L).

The lattice (L) is formed in presence of an aromatic compound (AC).

In the following the individual reactants are defined in more detail.

As stated above for the formation of the lattice (L) of the liquid clathrate (LC) an organo-silicon compound (OS) is necessary which reacts with the aluminoxane (A). The lattice is formed by reacting an organo-silicon compound (OS) with aluminoxane (A) in presence of an aromatic compound (AC). It is preferred that the organo-silicon compound (OS) doesn't comprise halogens, in particular doesn't comprise fluorine.

The preferred organo-silicon compound (OS) which is effective to form the lattice (L) with the aluminoxane (A) can be selected from the group of hydrocarbyloxysilanes of the formula $R_3Si-O[-SiR_2-O]_n-SiR_3$ or $Si-[O-R]_4$ wherein each R is, independently, a hydrocarbyl group having up to 20 carbon atoms (e.g. linear or branched alkyl, cycloalkyl, aryl, aralkyl, alkylaryl) and n is 0 to 3; and hydrocarbylpolysiloxanes having from 2 to 8 silicon atoms in the molecule and which are separated from each other by an oxygen atom such that there is a linear, branched or cyclic backbone of alternating Si and oxygen atoms, with the remainder of the four valence bonds of each of the silicon atoms individually satisfied by an univalent hydrocarbyl group, R, as just defined. Preferably the hydrocarbyl groups, R, are methyl, ethyl and phenyl. Examples of such organo-silicon compounds (OS) include tetra-methoxysilane, tetra-ethoxysilane, tetraphenoxysilane, methoxytrimethylsilane, ethoxytrimethylsilane, hexamethyldisiloxane, hexaethyldisiloxane, hexaphenyldisiloxane, tetramethyldiphenyldisiloxane, dimethyltetraphenyldisiloxane, hexamethylcyclotrisiloxane, octamethylcyclotetrasiloxane, octaphenylcyclotetrasiloxane, octamethyltrisiloxane, decamethyltetrasiloxane, dodecamethylpentasiloxane and tetradecamethylhexasiloxane, 1,3,3,5-tetramethyl-1,1,5,5-tetraphenyltrisiloxane, 1,1,1,5,5,5-hexamethyl3,3-diphenyltrisiloxane, and 1,1,1,3,5,5,5-heptamethyl-3-phenyltrisiloxane.

Preferably the organo-silicon compound (OS) is selected from the group consisting of octamethyltrisiloxane, decamethyltetrasiloxane, octamethylcyclotetrasiloxane, methoxytrimethylsilane, tetraethoxysilane and 1,1,1,3,5,5,5-heptamethyl-3-phenyltrisiloxane. Preferably the organo-silicon compound (OS) is octamethyltrisiloxane.

The aluminoxane (A) can be any conventional aluminoxane as is known in the art.

Aluminoxanes are commercially available or can be prepared according to prior art literature for example by the hydrolysis of aluminium alkyls either by direct water addition or by treatment with salt hydrates. There are a variety of methods for preparing aluminoxane and modified aluminoxanes, non-limiting examples of which are described in U.S. Pat. No. 4,665,208, U.S. Pat. No. 4,952,540, U.S. Pat. No. 5,091,352, U.S. Pat. No. 5,206,199, U.S. Pat. No. 5,204,419, U.S. Pat. No. 4,874,734, U.S. Pat. No. 4,924,018, U.S. Pat. No. 4,908,463, U.S. Pat. No. 4,968,827, U.S. Pat. No. 5,308,815, U.S. Pat. No. 5,329,032, U.S. Pat. No. 5,248,801, U.S. Pat. No. 5,235,081, U.S. Pat. No. 5,157,137, U.S. Pat. No. 5,103,031, U.S. Pat. No. 5,391,793, U.S. Pat. No. 5,391,529, U.S. Pat. No. 5,693,838, U.S. Pat. No. 5,731,253, U.S. Pat. No. 5,731,451 U.S. Pat. No. 5,744,656, EP-A-0 561 476, EP-B1-0 279 586, EP-A-0 594-218, and WO 94/10180, all of which are herein fully incorporated by reference.

Aluminoxanes are also called alumoxanes.

Preferably, $C_1$ to $C_{10}$-alkylalumoxanes, particularly methylalumoxane or modified methylalumoxane, isobutylalumoxane, e.g. TIBAO (tetraisobutylalumoxane) or HIBAO (hexaisobutylalumoxane) are used. More preferably the aluminoxane (A) is methylalumoxane (MAO). MAO is commercially available as 5 to 40 wt % solution in toluene.

A rapid catalytic activity depletion of the catalyst systems obtained by the precipitation technology could be observed at high concentrations of organo-silicon compounds (OS). The reason for this depletion, without being bound by theory, is the activity decreasing effect of the organo-silicon compounds (OS) due to its Lewis-acidity. It has now surprisingly been found that catalyst systems with high catalytic activity can be obtained in an efficient manner when the liquid clathrate (LC) is prepared from a composition comprising a specific ratio of aluminum (Al) from the aluminoxane (A) and the organo-silicon compounds (OS).

Preferably the mol ratio between the organo-silicon compound (OS) and aluminum (Al) of the aluminoxane (A) [(OS/(Al)] is equal or below 0.1, preferably in the range of 0.02 to 0.08, more preferably 0.02 to 0.07, most preferably 0.03 to 0.06, like 0.03 to 0.05. The mol-ratio is determined from the compounds provided in step (i) and relates to the starting concentrations as provided in step (i) of the process described.

The aromatic compound (AC) can be any aromatic compound suitable as host for the reaction of the organo-silicon compound (OS) with aluminoxane (A) from which the lattice (L) of the liquid clathrate (LC) is formed. The aromatic compound (AC) is preferably a liquid. Accordingly it is appreciated that the aromatic compound (AC) is an aromatic hydrocarbon solvent, such as for example toluene, benzene, xylenes, ethylbenzene, cumene, mesitylene or cymene. More preferably the aromatic compound (AC) is toluene. The liquid clathrate (LC) is obtainable by, preferably obtained by, (I) providing a mixture of an organo-silicon compound (OS), aluminoxane (A) and an aromatic compound (AC)
(II) obtaining a two phase system comprising an aromatic compound (AC) rich phase, and a liquid clathrate (LC) rich phase,
(III) separating the aromatic compound (AC) rich phase from the liquid clathrate (LC) rich phase.

It is preferred that the process from which the liquid clathrate (LC) is obtainable comprises formation of two stable immiscible organic layers, which remain intact such that the aromatic compound (AC) rich phase can be separated from the liquid clathrate (LC) rich phase.

The reaction is performed preferably under stirring and under inert atmosphere of for example $N_2$ or Argon at temperatures between −20 to 70° C., preferably between −10 to 60° C., more preferably between 0 to 50° C., even more preferably between 10 to 40° C., for example 20 to 30° C. A person skilled in the art can easily determine experimentally a suitable temperature for any of the organo-silicon compound (OS).

Preferably aluminoxane (A) in an aromatic compound (AC) is added to the organo silicon compound (OS). However, it is appreciated that also the organo silicon compound (OS) could be added to aluminoxane (A) in an aromatic compound (AC). Furthermore, it is appreciated that also the organo silicon compound (OS) could be provided as a solution in an aromatic compound (AC), in this case aluminoxane doesn't necessarily have to be provided in an aromatic compound (AC).

In an embodiment the aromatic compound (AC) rich phase constitutes the upper layer and the lower layer constitutes the liquid clathrate (LC) rich phase.

The upper phase is discarded and the lower liquid clathrate (LC) rich phase, i.e. the liquid clathrate (LC) solution, is optionally washed before further use. The liquid clathrate (LC) phase, i.e. the liquid clathrate (LC), is preferably washed once or up to 5 times, preferably once to three times, with a (liquid) hydrocarbon compound, preferably with the aromatic compound (AC) used for its preparation, like toluene.

The starting concentration of aluminoxane (A) in the aromatic compound (AC), like toluene, usually ranges from 5 to 40 wt.-% solution.

Phase separation into the two phase system may occur immediately, i.e. by mixing organo-silicon compound (OS), aluminoxane (A) and the aromatic compound (AC), or may commence after a few hours, like 4 hours, or after one or more days, like after one to three days. Separation can be improved if the mixture is cooled down to −20° C., if needed. Most often the phase separation occurs immediately. E.g. by using 5 to 40 wt-% methylaluminoxane (MAO) solution in toluene separation occurs immediately. However, phase separation time is dependent on the used aromatic compound (AC) and aluminoxane (A) concentrations therein as well type and amount of organo-silicon compound (OS).

Accordingly the reaction is characterized by the formation of a two phase system comprising two stable immiscible organic layers, which remain intact such that the upper layer, preferably the aromatic compound (AC) rich phase, can be separated from the lower phase, preferably the liquid clathrate (LC) layer, i.e. the liquid clathrate (LC).

For further processing the liquid clathrate (LC) phase, i.e. the liquid clathrate (LC) solution, is separated from the upper solvent layer by conventional separation techniques, for example by decantation, siphoning or draining.

Optionally the separated liquid clathrate (LC) phase can be washed before further use. Preferably the liquid clathrate phase (LC) is washed once or up to 5 times, preferably once to three times, with the aromatic compound (AC) used for its preparation.

The liquid clathrate (LC) as such is used in step (ii) and not for instance the liquid clathrate (LC) together with the upper phase formed during the preparation of the liquid clathrate (LC), i.e. the liquid clathrate (LC) solution.

In step (ii) the liquid clathrate (LC) is mixed with an organometallic compound (C) and a liquid mixture (MI) is obtained, from which the solid catalyst system (CS) can be precipitated (in step (iii)). Preferably the liquid mixture (MI) obtained is a solution. Solution, as defined earlier in this application, indicates that two or more substances are homogeneously mixed, e.g. it is not a two phase system.

The liquid clathrate (LC) is preferably reacted under stirring, with the organometallic compound (C), under inert atmosphere of for example $N_2$ or Argon at temperatures between −20 to 70° C., preferably between −10 to 60° C., more preferably between 0 to 50° C., even more preferably between 10 to 40° C., for example 20 to 30° C., to obtain the liquid mixture (MI) being a solution. A person skilled in the art can easily determine experimentally a suitable temperature for any liquid clathrate (LC) and the organometallic compound (C).

According to the present invention it has been found that not only the mol-ratio of aluminum (Al) from the aluminoxane (A) to the organo-silicon compounds (OS) has a strong influence on the catalytic activity of the catalyst system (CS) obtainable, but also the mol-ratio between aluminum (Al) of the aluminoxane (A) and transition metal (M) of the organometallic compound (C). Accordingly it is preferred that the mol-ratio between aluminum (Al) of the aluminoxane (A) and transition metal (M) of the organometallic compound (C) [(Al)/(M)] is ≤600, more preferred ≤500, like below 450. Furthermore, it is preferred that the mol-ratio between aluminum (Al) of the aluminoxane (A)

and transition metal (M) of the organometallic compound (C) [(Al)/(M)] is ≥50, more preferred ≥100, even more preferred ≥150. In other words it is preferred that the mol-ratio between aluminum (Al) of the aluminoxane (A) and transition metal (M) of the organometallic compound (C) [(Al)/(M)] is in a range from 50 to 600, preferably in a range from 100 to 500, like 150 to 450.

The mol-ratio is determined from the compounds provided in steps (i) and (ii) and relates to the starting concentrations as provided in steps (i) and (ii) of the process described.

Furthermore, it is preferred that essentially on the same level mol-ratio determined from the compounds provided in step (ii) is also present in the catalyst system (CS) obtained from the inventive process.

As is commonly known the catalytic activity of the catalyst system (CS) is normally higher with lower mol-ratio between aluminum (Al) of the aluminoxane (A) and transition metal (M) of the organometallic compound (C) [(Al)/(M)].

In the present invention it has been found that clathrating agent has a clear impact on catalyst activity.

Still in a more preferred embodiment the organometallic compound (C) used in the invention is of formula (II)

(L)$_2$RMX$_2$          (II)

wherein
"M" is zirconium (Zr) or hafnium (Hf),
each "X" is independently selected from halogen, $C_1$ to $C_6$ alkyl, $C_5$ to $C_6$ cycloalkyl, $C_1$ to $C_6$ alkoxy, phenyl and benzyl groups,
each "L" is independently a cyclopentadienyl, indenyl, tetrahydroindenyl, fluorenyl, which can be independently substituted or unsubstituted, preferably at least one organic ligand (L), preferably both organic ligands (L), comprise one or more substituents independently selected from $C_1$ to $C_{20}$ hydrocarbyl or silyl groups, which optionally contain one or more heteroatoms selected from groups 14 to 16 (IUPAC 2007) and/or are optionally substituted by halogen atom(s),
"R" is a divalent bridge selected from —R'$_2$C—, —R'$_2$Si—, wherein each R' is independently a hydrogen atom, $C_1$ to $C_{20}$ alkyl, $C_2$ to $C_{10}$ cycloalkyl, $C_6$ to $C_{20}$ aryl, $C_7$ to $C_{20}$ arylalkyl or $C_7$ to $C_{20}$ alkylaryl.

In the step (iii) the solid catalyst system (CS) is precipitated by adding a saturated aliphatic compound to the liquid mixture (MI) obtained from step (ii).

The precipitation is performed preferably under stirring and under inert atmosphere of for example N$_2$ or Argon at temperatures between 10 and 40° C., preferably between 15 and 35° C. and more preferably between 20 and 30° C.

Although the use of ambient temperatures is most convenient, i.e. from 10 to 30° C., some compounds require elevated or lower temperatures. A person skilled in the art can easily determine experimentally a suitable temperature depending on the type of aromatic compound used in the process.

The solid catalyst system (CS) is obtainable in a convenient and sustainable manner. The liquid mixture (MI), e.g. the liquid mixture (MI) being a solution, enables a person skilled in the art to accomplish precipitation with solvents in step (iii), which are convenient with respect to economic and ecologic considerations. Such solvents include saturated aliphatic compounds.

Accordingly in the instant process precipitation in step (iii) is accomplished by removing the aromatic compound (AC) from the liquid mixture of liquid clathrate (LC) and organometallic compound. The removal can be effected by different techniques.

According to the invention the precipitation in step (iii) is accomplished by adding a saturated aliphatic compound to the liquid mixture (MI) which causes a dilution effect for the aromatic compound (AC) leading to the precipitation of the catalyst system (CS).

It is a finding of the present invention that saturated aliphatic compounds can be employed in the process described for precipitating the catalyst system (CS) from the liquid mixture (MI). Preferably the aliphatic compound is selected from the group consisting of $C_1$ to $C_{20}$ alkanes, $C_4$ to $C_{12}$ cycloalkanes and combinations thereof, preferably $C_3$ to $C_{12}$ alkanes, like $C_5$ to $C_{10}$ alkanes. More preferably the aliphatic compound is selected from the group consisting of n-pentane, n-hexane, n-heptane, n-octane, and mixtures thereof. Even more preferably the aliphatic compound is n-pentane.

In a preferred embodiment the aromatic compound (AC) is toluene and/or the saturated aliphatic compound is selected from the group consisting of n-pentane, n-hexane, n-heptane, n-octane, and mixtures thereof. It is particularly preferred that the aromatic compound (AC) is toluene and the saturated aliphatic compound is n-pentane.

Further the saturated aliphatic compound, preferably n-pentane, is also inert in relation to the compounds of the solid catalyst system to be produced. The term "inert in relation to the compounds" means herein that the aliphatic compound, preferably the n-pentane, is chemically inert, i.e. undergoes no chemical reaction with the solid catalyst system (CS) and the compounds provided besides the aromatic compound (AC) for preparing the catalyst system (CS), i.e. the organo-silicon compound (OS) and the aluminoxane (A)).

The addition of the saturated aliphatic compound to the liquid mixture (MI) can be accomplished as known in the art, for instance by pouring the saturated aliphatic compound into the liquid mixture (MI). Typically after addition the obtained mixture is agitated (stirred) to facilitate the formation of the solid catalyst system (CS) particles. No specific temperature is needed. Precipitation can be accomplished in a broad temperature range, like 2 to 80° C. Optimal temperature is dependent on the individual components employed. The optimal precipitating temperature can vary e.g. from below 10 to above 50° C. Very good results are achievable at temperatures between 10 and 40° C., or between 15 and 35° C., like 20 to 30° C.

Alternatively the liquid mixture (MI) is introduced very fast into the saturated aliphatic compound, like spray-technology. This way of forming the solid catalyst system (CS) particles has the advantage that very spherical particles are obtained compared to simple pouring technique.

Optionally the process of the present invention comprises a fourth step (step (iv)), which is recovering the particles of the solid catalyst system (CS). In other words particles of the solid catalyst system (CS) which is obtained by the precipitation step (iii) may be separated and recovered by any procedure known in the art. For example, the solid catalyst particles in the suspension may be filtered. Other commonly known methods for isolating are decanting, centrifuging and flotation. The particles of solid catalyst system (CS) may then be optionally washed and/or dried to remove any solvent residuals present in the particles. The washing and/or drying of the catalyst particles may be carried out in any manner conventional in the art.

Furthermore, each of the steps, i.e. steps (i) to (iv), is preferably accomplished at a temperature in the range of 10 to 30° C., preferably in the range of 20 to 30° C.

The instant process leads to a solid catalyst system (CS), in particular to solid catalyst system (CS) without any need of using external support material. In other words a process is described wherein the solid catalyst system (CS) is unsupported, i.e. during the process no carrier material is added.

From the process described a solid catalyst system (CS) can be obtained.

In other words the present invention is also directed at a solid catalyst system (CS) as described in the process of the invention.

In a preferred embodiment the invention is also directed at a solid catalyst system (CS) comprising the reaction product of
(a) a liquid clathrate (LC) obtained by mixing an aluminoxane (A), an aromatic compound (AC) and an organo-silicon compound (OS), wherein the mol-ratio between the organo-silicon compound (OS) and aluminum (Al) of the aluminoxane (A) [(OS)/(Al)] is below 0.1 and
(b) an organometallic compound (C), said organometallic compound (C) is of formula (I)

$(L)_m R_n MX_q$  (I)

wherein
"M" is a transition metal (M) of Group 3 to 10 of the Periodic Table (IUPAC 2007),
each "X" is independently a monoanionic ligand, such as σ-ligand,
each "L" is independently an organic ligand which coordinates to the transition metal (M),
"R" is a bridging group linking said organic ligands (L),
"m" is 2 or 3, preferably 2,
"n" is 0, 1 or 2, preferably 1,
"q" is 1, 2 or 3, preferably 2,
m+q is equal to the valency of the transition metal (M).

In a more preferred embodiment the invention is also directed at a solid catalyst system (CS) comprising the reaction product of
(a) a liquid clathrate (LC) obtained by mixing an aluminoxane (A), an aromatic compound (AC) and an organo-silicon compound (OS), wherein the mol-ratio between the organo-silicon compound (OS) and aluminum (Al) of the aluminoxane (A) [(OS)/(Al)] is below 0.08 and
(b) an organometallic compound (C) of formula (II)

$(L)_2 RMX_2$  (II)

wherein
"M" is zirconium (Zr) or hafnium (Hf),
each "X" is independently selected from halogen, $C_1$ to $C_6$ alkyl, $C_5$ to $C_6$ cycloalkyl, $C_1$ to $C_6$ alkoxy, phenyl and benzyl groups,
each "L" is independently a cyclopentadienyl, indenyl, tetrahydroindenyl, fluorenyl, which can be independently substituted or unsubstituted, preferably at least one organic ligand (L), preferably both organic ligands (L), comprise one or more substituents independently selected from $C_1$ to $C_{20}$ hydrocarbyl or silyl groups, which optionally contain one or more heteroatoms selected from groups 14 to 16 and/or are optionally substituted by halogen atom(s),
"R" is a divalent bridge selected from —$R'_2C$—, —$R'_2Si$—, wherein each R' is independently a hydrogen atom, $C_1$ to $C_{20}$ alkyl, $C_2$ to $C_{10}$ cycloalkyl.

All preferred embodiments of reactants as disclosed above are valid to the preparation of catalyst system as well to catalyst system as such.

Furthermore, a solid catalyst system (CS) is preferred, wherein said solid catalyst system (CS) is obtained by mixing said liquid clathrate (LC) with the organometallic compound (C) obtaining a liquid mixture (MI), wherein further the solid catalyst system (CS) is precipitated from said liquid mixture (MI) by adding a saturated aliphatic compound to said liquid mixture (MI).

In an embodiment a solid catalyst system (CS) is preferred, wherein mol-ratio between the aluminum (Al) of the aluminoxane (A) and the transition metal (M) of the organometallic compound (C) [(Al)/(M)] is ≤600, more preferred ≤500, even more preferred ≤450. Furthermore, it is preferred that the mol-ratio between aluminum (Al) of the aluminoxane (A) and transition metal (M) of the organometallic compound (C) [(Al)/(M)] is ≥50, more preferred ≥100, even more preferred ≥150. In other words it is preferred that the mol-ratio between aluminum (Al) of the aluminoxane (A) and transition metal (M) of the organometallic compound (C) [(Al)/(M)] is in a range from 50 to 600, preferably in a range from 100 to 600, like 120 to 500.

The present invention is also directed at a solid catalyst system (CS) prepared according to above process, wherein the organo-silicon compound (OS) is preferably selected from the group consisting of octamethyltrisiloxane, decamethyltetrasiloxane, octamethylcyclotetrasiloxane, methoxytrimethylsilane and tetraethoxysilane include tetra-methoxysilane, tetraphenoxysilane, ethoxytrimethylsilane, hexamethyldisiloxane, hexaethyldisiloxane, hexaphenyldisiloxane, tetramethyldiphenyldisiloxane, dimethyltetraphenyldisiloxane, hexamethylcyclotrisiloxane, octaphenylcyclotetrasiloxane dodecamethylpentasiloxane and tetradecamethylhexasiloxane, 1,3,3,5-tetramethyl-1,1,5,5-tetraphenyltrisiloxane, 1,1,1,5,5,5-hexamethyl3,3-diphenyltrisiloxane, 1,1,1,3,5,5,5-heptamethyl-3-phenyltrisiloxane; and/or the aromatic compound (AC) is toluene; and/or the saturated aliphatic compound is selected from the group consisting of n-pentane, n-hexane, n-heptane, n-octane, and mixtures thereof.

Preferred is a solid catalyst system (CS), wherein the liquid mixture (MI) is homogeneous; and the solid catalyst system (CS) is unsupported, i.e. during the process no carrier material is added.

Thus, the present invention is also directed at the use of a solid catalyst system (CS) for the preparation of a polymer, like polyethylene and/or polypropylene.

Furthermore, the present invention is also directed at the preparation of a polymer, like a polypropylene or polyethylene, by polymerising monomer units, like propylene and/or ethylene in the presence of a solid catalyst system (CS) as defined above.

Finally, the present invention is also directed at the preparation of a polymer, like a polypropylene, comprising the steps of preparing a solid catalyst system (SC) according to the process described, using said solid catalyst system (SC) in a polymerisation process, thereby obtaining the polymer, like the polypropylene.

Polymerisation of olefins, like propylene and ethylene optionally with other comonomers, like $C_2$ to $C_8$, e.g. ethylene, butylenes or hexene, can be carried out in one or more polymerisation steps comprising solution, slurry/liquid and gas phase polymerisation or any combination thereof. Polymerisation configuration can comprise one or more polymerisation reactors or combination of reactors.

Considering the information provided above, the following embodiments are especially preferred:

[1.] Process for the preparation of a solid catalyst system (CS) comprising the steps of
(i) preparing a liquid clathrate (LC) comprising a mixing of an aluminoxane (A), an aromatic compound (AC) and an organo-silicon compound (OS), wherein the mol-ratio between the organo-silicon compound (OS) and aluminum (Al) of the aluminoxane (A) [(OS)/(Al)] is below 0.1,
(ii) mixing said liquid clathrate (LC) with an organometallic compound (C) obtaining a liquid mixture (MI),
(iii) precipitating the solid catalyst system (CS) out of said liquid mixture (MI) by adding a saturated aliphatic compound to said mixture liquid (MI),
(iv) optionally recovering particles of the solid catalyst system (CS).

[2.] Process according to paragraph [1], wherein said organometallic compound (C) is of formula (I)

$$(L)_m R_n MX_q \quad (I)$$

wherein
"M" is a transition metal (M) of group 3 to 10 of the Periodic Table (IUPAC 2007),
each "X" is independently a mono anionic ligand, like a σ-ligand,
each "L" is independently an organic ligand which coordinates to the transition metal "M",
"R" is a bridging group linking said organic ligands (L),
"m" is 1, 2 or 3, preferably 2,
"n" is 0, 1 or 2, preferably 1,
"q" is 1, 2 or 3, preferably 2,
m+q is equal to the valency of the transition metal (M).

[3.] Process according to paragraph [1] or [2], wherein the mol-ratio between the aluminum (Al) of the aluminoxane (A) and the transition metal (M) of the organometallic compound (C) [(Al)/(M)] is in the range of 50 to 600.

[4.] Process according to any one of paragraphs [1] to [3], wherein the organo-silicon compound (OS) is selected from the group consisting of octamethyltrisiloxane, decamethyltetrasiloxane, octamethylcyclotetrasiloxane, methoxytrimethylsilane, tetraethoxysilane and 1,1,1,3,5,5,5-heptamethyl-3-phenyltrisiloxane

[5.] Process according to any one of paragraphs [1] to [4], wherein
(a) the aromatic compound (AC) is toluene; and/or
(b) the saturated aliphatic compound is selected from the group consisting of n-pentane, n-hexane, n-heptane, n-octane, and mixtures thereof.

[6.] Process according to any one of paragraphs [1] to [5], wherein
(a) step (i), i.e. the mixing of aluminoxane (A), an aromatic compound (AC) and an organo-silicon compound (OS), is accomplished at a temperature in the range of −20 to 70° C., preferably in the range of 10 to 40° C.
(b) step (ii), i.e. the mixing of the liquid clathrate (LC) with an organometallic compound (C) is accomplished at a temperature in the range of 0 to 50° C., preferably in the range of 20 to 30° C.

[7.] Process according to any one of paragraphs [1] to [6], wherein
(a) the liquid mixture (MI) is homogeneous; and/or
(b) during the process no carrier material is added.

[8.] Process according to any one of the paragraphs [1] to [7], wherein the organometallic compound (C) is formula (II)

$$(L)_2 RMX_2 \quad (II)$$

wherein
"M" is zirconium (Zr) or hafnium (Hf),
each "X" is independently selected from halogen, $C_1$ to $C_6$ alkyl, $C_5$ to $C_6$ cycloalkyl, $C_1$ to $C_6$ alkoxy, phenyl and benzyl groups,
each "L" is independently a cyclopentadienyl, indenyl, tetrahydroindenyl, fluorenyl, which can be independently substituted or unsubstituted, preferably at least one organic ligand (L), preferably both organic ligands (L), comprise one or more substituents independently selected from $C_1$ to $C_{20}$ hydrocarbyl or silyl groups, which optionally contain one or more heteroatoms selected from groups 14 to 16 and/or are optionally substituted by halogen atom(s),
"R" is a divalent bridge selected from —R'$_2$C—, —R'$_2$Si—, wherein each R' is independently a hydrogen atom, $C_1$ to $C_{20}$ alkyl, $C_2$ to $C_{10}$ cycloalkyl.

[9.] Solid catalyst system (CS) obtained according to any one of paragraphs [1] to [8].

[10.] Solid catalyst system (CS) comprising the reaction product of
(a) a liquid clathrate (LC) obtained by mixing an aluminoxane (A), an aromatic compound (AC) and an organo-silicon compound (OS), wherein the mol-ratio between the organo-silicon compound (OS) and aluminum (Al) of the aluminoxane (A) [(OS)/(Al)] is below 0.08, and
(b) an organometallic compound (C), said organometallic compound (C) is of formula (I)

$$(L)_m R_n MX_q \quad (I)$$

wherein
"M" is a transition metal (M) of Group 3 to 10 of the Periodic Table (IUPAC 2007),
each "X" is independently a σ-ligand,
each "L" is independently an organic ligand which coordinates to the transition metal (M),
"R" is a bridging group linking said organic ligands (L),
"m" is 2 or 3, preferably 2,
"n" is 0, 1 or 2, preferably 1,
"q" is 1, 2 or 3, preferably 2,
m+q is equal to the valency of the transition metal (M).

[11.] Solid catalyst system (CS) according to paragraph [10], wherein the solid catalyst system is obtained by mixing said liquid clathrate (LC) with the organometallic compound (C) obtaining a liquid mixture (MI), wherein further the solid catalyst system (CS) is precipitated from said mixture (MI) by adding a saturated aliphatic compound to said mixture (MI).

[12.] Solid catalyst system (CS) according to paragraph [10] or [11], wherein mol-ratio between the aluminum (Al) of the aluminoxane (A) and the transition metal (M) of the organometallic compound (C) [(Al)/(M)] is equal or below 600, preferably in the range of 100 to equal or below 600.

[13.] Solid catalyst system (CS) according to any one of the paragraphs [10] to [12], wherein
(a) the organo-silicon compound (OS) is selected from the group consisting of octamethyltrisiloxane, decamethyltetrasiloxane, octamethylcyclotetrasiloxane, methoxytrimethylsilane and tetraethoxysilane; and/or
(b) the aromatic compound (AC) is toluene; and/or
(c) the saturated aliphatic compound is selected from the group consisting of n-pentane, n-hexane, n-heptane, n-octane, and mixtures thereof.

[14.] Solid catalyst system (CS) according to any one of the paragraphs [10] to [13], wherein
(a) the mixture (MI) is homogeneous; and/or
(b) the solid catalyst system (CS) is unsupported, i.e. during the process no carrier material is added.

[15.] Solid catalyst system (CS) according to any one of the paragraphs [10] to [14], wherein the organometallic compound (C) is formula (II)

$$(L)_2RMX_2 \quad (II)$$

wherein
"M" is zirconium (Zr) or hafnium (Hf),
each "X" is independently selected from halogen, $C_1$ to $C_6$ alkyl, $C_5$ to $C_6$ cycloalkyl, $C_1$ to $C_6$ alkoxy, phenyl and benzyl groups,
each "L" is independently a cyclopentadienyl, indenyl, tetrahydroindenyl, fluorenyl, which can be independently substituted or unsubstituted, preferably at least one organic ligand (L), preferably both organic ligands (L), comprise one or more substituents independently selected from $C_1$ to $C_{20}$ hydrocarbyl or silyl groups, which optionally contain one or more heteroatoms selected from groups 14 to 16 and/or are optionally substituted by halogen atom(s),
"R" is a divalent bridge selected from —R'$_2$C—, —R'$_2$Si—, wherein each R' is independently a hydrogen atom, $C_1$ to $C_{20}$ alkyl, $C_2$ to $C_{10}$ cycloalkyl.

[16.] Use of a solid catalyst system (CS) as defined in any one of the paragraphs [9] to [15] for the preparation of a polymer, like a polypropylene or polyethylene or any copolymers thereof.

[17.] Preparation of a polymer, like a polypropylene or polyethylene, by polymerising monomer units in the presence of a solid catalyst system (CS) as defined in any one of the paragraphs [9] to [15].

[18.] Preparation of a polymer, like a polypropylene or polyethylene, comprising the steps of
(A) preparing a solid catalyst system (SC) according to the paragraphs [1] to [8],
(B) using said solid catalyst system (SC) in a polymerisation process thereby obtaining the polymer, like the polypropylene or polyethylene.

EXAMPLES

Figure 1:
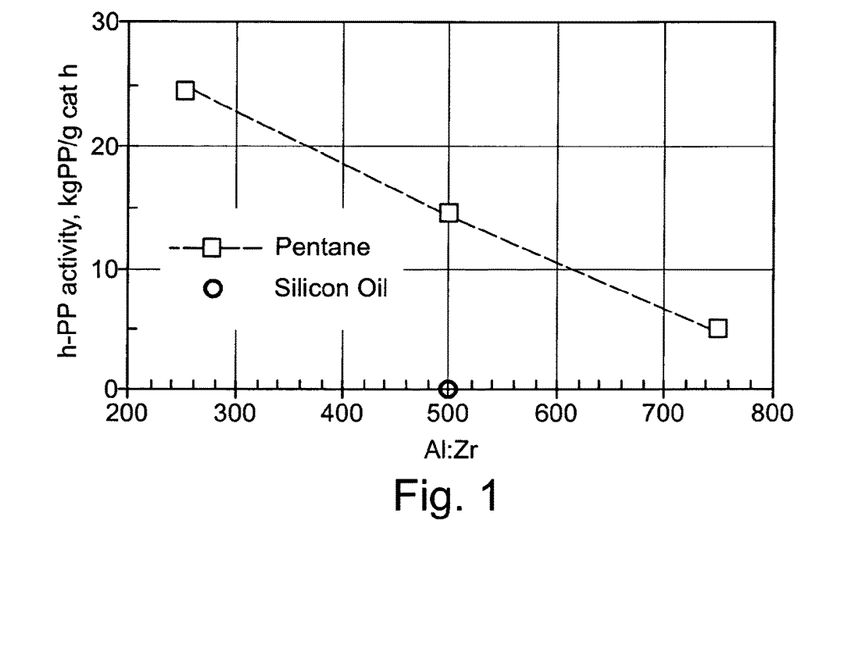
FIG. 1: Catalyst activity of Polymerisation examples 2, 4 and 5 (Catalyst Examples 2, 5 and 6, resp.) obtained by precipitation with pentane as a function of [(Al)/(Zr)] compared to catalyst activity of Comparative Example 1 obtained by precipitation in silicon oil as a function of mol ratio [(Al)/(Zr)].
Figure 2:
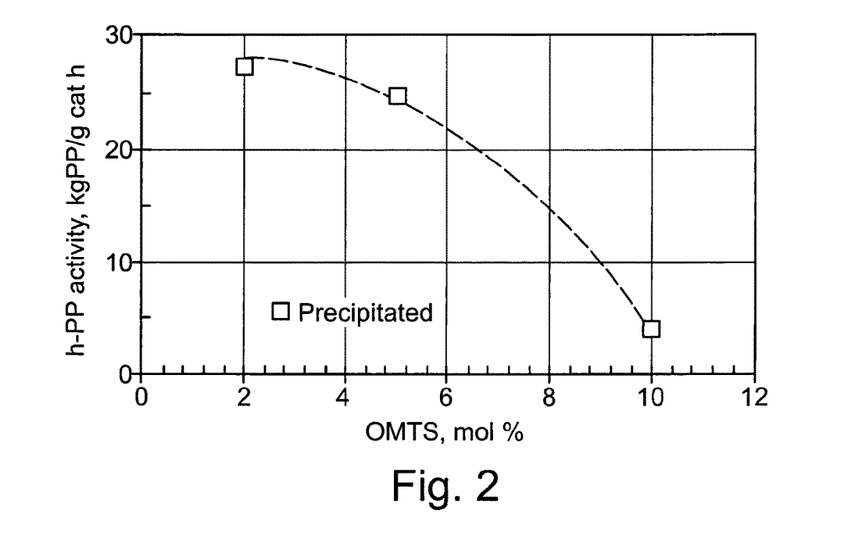
FIG. 2: Catalyst activity of Polymerisation examples P3, P2 and P1 (Catalyst Examples 4, 2 and 1, resp) obtained by precipitation with pentane as a function of mol ratio [(OS)/(Al)].

The following definitions of terms and determination methods apply for the above general description of the invention as well as to the below examples, unless otherwise defined.

1. Measuring Methods

MFR$_2$ (230° C.) is measured according to ISO 1133 (230° C., 2.16 kg load) for polypropylene.
MFR$_2$ (190° C.) is measured according to ISO 1133 (190° C., 2.16 kg load) for polyethylene.
ICP Analysis The elemental analysis of a catalyst was performed by taking a solid sample of mass, M, cooling over dry ice. Samples were diluted up to a known volume, V, by dissolving in nitric acid (HNO$_3$, 65%, 5% of V) and freshly deionised (DI) water (5% of V). The solution was then diluted with DI water up to the final volume, V, and left to stabilise for two hours.

The analysis was run at room temperature using a Thermo Elemental iCAP 6300 Inductively Coupled Plasma-Optical Emmision Spectrometer (ICP-OES) which was calibrated using a blank (a solution of 5% HNO$_3$, 3% HF in DI water), and 6 standards of 0.5 ppm, 1 ppm, 10 ppm, 50 ppm, 100 ppm and 300 ppm of Al, with 0.5 ppm, 1 ppm, 5 ppm, 20 ppm, 50 ppm and 100 ppm of Hf and Zr in solutions of 5% HNO$_3$, 3% HF in DI water.

Immediately before analysis the calibration is 'resloped' using the blank and 100 ppm Al, 50 ppm Hf, Zr standard, a quality control sample (20 ppm Al, 5 ppm Hf, Zr in a solution of 5% HNO$_3$, 3% HF in DI water) is run to confirm the reslope. The QC sample is also run after every $5^{th}$ sample and at the end of a scheduled analysis set.

The content of hafnium was monitored using the 282.022 nm and 339.980 nm lines and the content for zirconium using 339.198 nm line. The content of aluminium was monitored via the 167.079 nm line, when Al concentration in ICP sample was between 0-10 ppm (calibrated only to 100 ppm) and via the 396.152 nm line for Al concentrations above 10 ppm.

The reported values are an average of three successive aliquots taken from the same sample and are related back to the original catalyst by inputting the original mass of sample and the dilution volume into the software.

Molecular Weight Averages, Molecular Weight Distribution (Mn, Mw, Mz, MWD)

Molecular weight averages (Mz, Mw and Mn), Molecular weight distribution (MWD) and its broadness, described by polydispersity index, PDI=Mw/Mn (wherein Mn is the number average molecular weight and Mw is the weight average molecular weight) were determined by Gel Permeation Chromatography (GPC) according to ISO 16014-1:2003, ISO 16014-2:2003, ISO 16014-4:2003 and ASTM D 6474-12 using the following formulas:

$$M_n = \frac{\sum_{i=1}^{N} A_i}{\sum_{i=1}^{N} (A_i/M_i)} \quad (1)$$

$$M_w = \frac{\sum_{i=1}^{N} (A_i \times M_i)}{\sum_{i=1}^{N} A_i} \quad (2)$$

$$M_z = \frac{\sum_{i=1}^{N} (A_i \times M_i^2)}{\sum_{i=1}^{N} (A_i/M_i)} \quad (3)$$

For a constant elution volume interval $\Delta V_i$, where $A_i$, and $M_i$ are the chromatographic peak slice area and polyolefin molecular weight (MW), respectively associated with the elution volume, $V_i$, where N is equal to the number of data points obtained from the chromatogram between the integration limits.

A high temperature GPC instrument, equipped with either infrared (IR) detector (IR4 or IR5 from PolymerChar (Valencia, Spain) or differential refractometer (RI) from Agilent Technologies, equipped with 3× Agilent-PLgel Olexis and 1× Agilent-PLgel Olexis Guard columns was used. As the solvent and mobile phase 1,2,4-trichlorobenzene (TCB) stabilized with 250 mg/L 2,6-Di tert butyl-4-methyl-phenol) was used. The chromatographic system was operated at 160° C. and at a constant flow rate of 1 mL/min. 200 μL of sample solution was injected per analysis. Data collection was performed using either Agilent Cirrus software version 3.3 or PolymerChar GPC-IR control software.

The column set was calibrated using universal calibration (according to ISO 16014-2:2003) with 19 narrow MWD polystyrene (PS) standards in the range of 0.5 kg/mol to 11 500 kg/mol. The PS standards were dissolved at room temperature over several hours. The conversion of the polystyrene peak molecular weight to polyolefin molecular weights is accomplished by using the Mark Houwink equation and the following Mark Houwink constants:

$K_{PS}=19\times10^{-3}$ mL/g, $\alpha_{PS}=0.655$ $K_{PE}=39\times10^{-3}$ mL/g, $\alpha_{PE}=0.725$ $K_{PP}=19\times10^{-3}$ mL/g, $\alpha_{PP}=0.725$ A third order polynomial fit was used to fit the calibration data.

All samples were prepared in the concentration range of 0.5 to 1.0 mg/ml and dissolved at 160° C. for 2.5 hours for polypropylene or 3 hours for polyethylene under continuous gentle shaking.

Catalyst Productivity

The catalyst productivity is defined as the amount of polymer in kilograms obtained per gram solid catalytic component used (kg polymer/g catalyst).

Catalyst Activity

The catalyst activity is defined as the amount of polymer in kilograms obtained per gram solid catalytic component and polymerisation time (kg polymer/g catalyst×time)

2. Chemicals

Methylaluminoxane (MAO)

MAO was purchased from Chemtura as 30 wt-% solution in toluene.

Octamethyltrisiloxane (OMTS) was purchased from Aldrich (Octamethyltrisiloxane Mw 236.53 g/mol, CAS 107-51-7) and distilled from CaH.

1,3,3,5-tetramethyl-1,1,5,5-tetraphenyltrisiloxane (OS2), CAS 3982-82-9

Triisobutylaluminium (TIBA)

TIBA was purchased from Crompton (TIBA, CAS 100-99-2).

Triethylaluminum (TEA)

TEA was purchased from Crompton. (TEA CAS 97-93-8)

Hydrogen

Hydrogen was purchased from AGA and purified according to standard methods before use.

Ethylene, Propylene and Hexene

Ethylene, propylene and hexene were provided from *Borealis* in polymerisation grade and purified according to standard methods.

Pentane

Pentane was degassed by sparging argon for 30 min and stored over molecular sieves.

Toluene

Toluene was purified according to the standard purification method.

Metallocene A rac-methyl(cyclohexyl)silanediyl-bis[(2-methyl-4-(4-tert-butylphenyl)indenyl]zirconium dichloride (CAS no 888227-55-2, WO2006/060544) purchased from commercial source, Metallocene B Dichloro-bis[(1-butyl-3-methyl)cyclopentadienyl]zirconium, CAS no 151840-68-5

3. Preparation of the Catalyst System (CS)

Example 1

All chemicals were handled and the steps were preformed under inert gas atmosphere ($N_2$ or Ar gas)

Preparation of Liquid Clathrate 10.3 mmol MAO (30 wt % in toluene) was added to 1.03 mmol OMTS (mol-ratio between OMTS and aluminum (Al) of the aluminoxane (A) [OMTS/(Al)]=0.1). The solution was stirred for 12 h at room temperature (20 to 25° C.). Stirring was stopped and separation of the solution into two phases was clearly seen. The upper phase (toluene) was removed and the lower phase (clathrate). The lower phase (clathrate) was washed twice by adding 1 mL toluene for each washing step and lower phase was isolated.

Preparation of the Mixture Liquid (MI)

0.041 mmol of Metallocene A was added to the clathrate phase obtained from the preparation of the liquid clathrate. A solution with a mol-ratio between aluminum (Al) of the aluminoxane (A) and zirconium (Zr) of the Metallocene A of

[(Al)/(M)]=250 was obtained. The solution was stirred for 2 h at room temperature (20 to 25° C.).

Precipitation of the Catalyst System

Subsequently 4.0 mL pentane was added and the solution was stirred for 12 h at room temperature (20 to 25° C.). A solid precipitate was formed and the liquid was decanted. The residue of the liquid was removed with a pipette. The solid precipitate was washed twice by adding 3 mL pentane for each washing step and washing liquids were discarded. The solid was dried in vacuum at 0.03 mbar for 30 to 40 minutes. The solid was sieved through a 50 µm sieve to yield 400 mg of the catalyst as a pink powder.

Example 2

Example 2 was prepared as described in Example 1 but instead of 1.03 mmol OMTS only 0.515 mmol OMTS (mol-ratio between OMTS and aluminum (Al) of the aluminoxane (A) [OMTS/(Al)]=0.05) was added. 390 mg of product were collected in the form of pink powder. ICP analysis showed 37.9 wt.-% Al and 0.61 wt.-% Zr content.

Example 3

Example 3 was prepared as described in Example 2 but instead of Metallocene A Metallocene B was added. 370 mg of product were collected in the form of yellowish powder. ICP analysis showed 35.1 wt.-% Al and 0.75 wt.-% Zr content.

Example 4

Example 4 was prepared as described in Example 1 but instead of 1.03 mmol OMTS only 0.206 mmol OMTS (mol-ratio between OMTS and aluminum (Al) of the aluminoxane (A) [OMTS/(Al)]=0.02 was added. 390 mg of product were collected in the form of pink powder. ICP analysis showed 36.3 wt.-% Al and 0.91 wt.-% Zr.

Example 5

Example 5 was prepared as described in Example 2 but the amount of metallocene was 0.0205 mmol, thus the mol-ratio between aluminum (Al) of the aluminoxane (A) and zirconium (Zr) of the Metallocene A was increased from [(Al)/(M)]=250 to [(Al)/(M)]=500 in the feed. 370 mg of product were collected in the form of pink powder. ICP analysis showed 31.9 wt.-% Al and 0.32 w.-% Zr content.

Example 6

Example 6 was prepared as described in Example 2 but the amount of metallocene was only 0.0137 mmol, thus the mol-ratio between aluminum (Al) of the aluminoxane (A) and zirconium (Zr) of the Metallocene A was increased from [(Al)/(M)]=250 to [(Al)/(M)]=750 in the feed. 280 mg of product were collected in the form of pink powder. ICP analysis showed 37.2 wt.-% Al and 0.21 wt.-% Zr content Example 7

Example 7 was prepared as described in Example 2 but instead of using OMTS (0.515 mmol) 0.515 mmol of 1,3,3,5-tetramethyl-1,1,5,5-tetraphenyltrisiloxane (OS2) was used. In other words, an alternative organosilicon compound was used. 250 mg of product were collected in the form of pink powder. ICP analysis showed 35.4 wt.-% Al and 1.11 wt.-% Zr content.

Comparative Example 1

Comparative Example 1 is an catalyst system comprising Metallocene A, a mol-ratio between aluminum (Al) of the aluminoxane (A) and zirconium (Zr) of the Metallocene A of [(Al)/(M)]=500 and a mol-ratio between OMTS and aluminum (Al) of the aluminoxane (A) [OMTS/(Al)]=0.05, which was prepared by the silicon oil route by the precipitation method according to the principles and examples 1 to 2 as described in EP 2 386 582.

Comparative Example 2

Catalyst was prepared by adding metallocene B to MAO in a mol-ratio between aluminum (Al) of the aluminoxane (A) and zirconium (Zr) [(Al)/(M)]=250 without using any chlatrating agent. Catalyst solution was precipitated with pentane according to the example 3. Due to high solubility of MAO-metallocene catalyst, only a trace amount of solid product were obtained, only 30 mg of the catalyst were isolated compared to the yield of 370 mg in example 3 run on the same scale. Thus, it was clear that catalyst preparation using precipitation method without any clathrating agent does by no means make any sense.

Comparative Example 3

Catalyst was prepared according to the example 2 except for the fact that the upper layer has not been removed upon the formation of the liquid clathrate mixture, and metallocene A was added to a heterogeneous liquid-liquid mixture. After stirring for 12 hours, pentane was added and the work-up was carried out as in the Example 2. The catalyst was isolated in the form of pink powder (0.4 g). ICP analysis showed 37.4 wt.-% Al and 0.44 wt.-% Zr content.

4. Preparation of Polymers from the Catalyst Systems (CS) Polypropylene

A 5 liter stainless steel reactor was used for propylene polymerisations. 1100 g of liquid propylene (*Borealis* polymerisation grade) was fed to the reactor. 0.2 ml triethylaluminum was fed as a scavenger and 15 mmol hydrogen as chain transfer agent. Reactor temperature was set to 20° C. Desired amount of catalyst (20 to 28 mg) was flushed into to the reactor in 5 ml PFC with nitrogen overpressure. After 5 minutes the reactor was heated to 70° C. in a period of about 15 minutes. The polymerisation is stopped after 60 minutes by venting the reactor and flushing with nitrogen before the polymer is collected.

The catalyst activity was calculated on the basis of the 60 minutes period according to the following formula:

$$\text{Catalyst Activity (kg/(g}(cat)*\text{h)}) = \frac{\text{amount of polymer produced (kg)}}{\text{catalyst loading (g)} \times \text{polymerisation time (h)}}$$

Polyethylene

Polymerisation experiments were carried out in PPR (Parallel Pressure Reactor) which are stirred reactors each reactor having a volume of 21 mL. Reactor was conditioned by purging it with dry nitrogen for 6 hours at 80° C. Pre-weighed disposable glass vials and disposable flat stirring paddles were fitted into the reactor. Reactor was then closed and thoroughly flushed with propylene prior the experiment. 5 µmol of freshly made TIBA solution (200 µL, of 25 mM solution in heptane) was added through a valve to all 48 reactors. Reactors were pressurised to 278 kPa (40 psi) with ethylene to ensure that all the individual reactors were maintaining pressure. Stirring speed was the set up to 800 rpm for all reactors and the temperature increased to 80° C. Once the temperature was stable the reactors were pressurised to 63 psi with ethylene. The reactor temperatures were maintained at 80° C. by computer control during the experiment. Catalyst slurries were made by mixing catalysts with dodecane so that concentration of the resulting slurry was 12 25 mg/mL. Vortexing of 1200 rpm was applied to ensure formation of homogenous slurry. Once the reactor temperature was stabilized catalysts were added into the reactors though a valve. Pressure in the reactors was maintained at 63 psi during the experiment. Polymerisations were continued for 60 minutes after which the reaction was terminated by addition of CO2 (20%/80% of $CO_2/N_2$ was used to pressurize the reactors to 2.9 MPa). Once cooled, the reactor was degassed and flushed repeatedly with nitrogen.

The catalyst activity was calculated on the basis of the 60 minutes period according to the following formula: Catalyst Activity (kg/(g(cat) h)) amount of polymer produced (kg) catalyst loading (g) polymerisation time (h)

The catalyst activity was calculated on the basis of the 60 minutes period according to the following formula: Catalyst Activity (kg/(g(cat) h)) amount of polymer produced (kg) catalyst loading (g) polymerisation time (h)

$$\text{Catalyst Activity (kg/(g}(cat)*\text{h))} = \frac{\text{amount of polymer produced (kg)}}{\text{catalyst loading (g)} \times \text{polymerisation time (h)}}$$

Polyethylene 1-Hexene Copolymer

The polymerisation was carried out in an autoclave reactor (2 L) purchased from Buchi, equipped with a paddle stirrer and a continuous ethylene supply.

The reactor was purged with $N_2$ and filled with propane (900 ml) and 150 g ethene (*Borealis* polymerisation grade) and 25 mL 1-hexene (*Borealis* polymerisation grade). 1.5 ml of TIBA was fed as a scavenger in 5 mL of dry and degassed pentane. The temperature was raised to 60° C. and then the desired amount of catalyst was flushed into the reactor with nitrogen overpressure. The temperature was subsequently raised to 80° C. The polymerisation is stopped after 60 minutes by venting the reactor and flushing with nitrogen before the polymer was collected.

The catalyst activity was calculated on the basis of the 60 minutes period according to the following formula:

$$\text{Catalyst Activity (kg/(g}(cat)*\text{h))} = \frac{\text{amount of polymer produced (kg)}}{\text{catalyst loading (g)} \times \text{polymerisation time (h)}}$$

5. Determining the Catalytic Activity of the Catalyst System (CS)

TABLE 1

Polymerisation results of polypropylene

| PE | CE | MC | [OMTS/(Al)] [—] | Catalytic activity [kg PP/g cat * h] | $MFR_2$ [g/10 min] |
|---|---|---|---|---|---|
| P1 | Ex. 1 | A | 0.10 | 4.1 | 3.7 |
| P2 | Ex. 2 | A | 0.05 | 24.6 | 3.6 |
| P3 | Ex. 4 | A | 0.02 | 27.2 | 2.9 |
| P4 | Ex. 5 | A | 0.05 | 14.6 | 3.7 |
| P5 | Ex. 6 | A | 0.05 | 5.3 | N/A |
| P6 | Ex 7 | A | 0.05* | 54.1 | 4.7 |
| CP1 | Comp. Ex. 1 | A | 0.05 | 0.1 | N/A |
| CP2 | Comp. Ex. 3 | A | 0.05 | 1.6 | N/A |

*OS2 used instead of OMTS
PE Polymerisation example
CE Catalyst example
MC Metallocene

TABLE 2

Polymerisation results of polyethylene (homoPE), data from PPR

| PE | CE | MC | [OMTS/(Al)] [—] | Catalytic activity [kg PE/g cat * h] | Mw [kg/mol] |
|---|---|---|---|---|---|
| P7 | Ex. 1 | A | 0.1 | 6.0 | 572 |
| P8 | Ex. 2 | A | 0.05 | 6.4 | 441 |
| P9 | Ex. 3 | B | 0.05 | 1.3 | 231 |

PE Polymerisation example
CE Catalyst example
MC Metallocene

TABLE 3

Polymerisation results of polyethylene/1-hexene copolymer

| PE | CE | MC | Catalytic activity [kg PE/g cat * h] | $MFR_2$ [g/10 min] | Hexene [wt.-%] |
|---|---|---|---|---|---|
| P10 | Ex. 3 | B | 11.2 | 2.2 | 1.7 |

PE Polymerisation example
CE Catalyst example
MC Metallocene

The examples provide that the catalytic activity in polymerisation process significantly exceeded the catalytic activity of solid unsupported catalyst systems obtained by the precipitation technology known from the state. Further, it has been shown that precipitation of catalyst without any chlathrating agent does not lead to a solid catalyst in any reasonable yield.

The invention claimed is:
1. A process for the preparation of a solid catalyst system (CS) comprising the steps of
   (i) preparing a liquid clathrate (LC) comprising a mixing of an aluminoxane (A), an aromatic compound (AC) and an organo-silicon compound (OS), wherein the mol-ratio between the organo-silicon compound (OS) and aluminum (Al) of the aluminoxane (A) [(OS)/(Al)] is equal or below 0.1,
   (ii) mixing said liquid clathrate (LC) with an organometallic compound (C),
   (iii) obtaining a liquid mixture (MI), wherein the liquid mixture (MI) is homogeneous, precipitating the solid catalyst system (CS) out of said liquid mixture (MI) by adding a saturated aliphatic compound to said liquid mixture (MI), and (iv) optionally recovering particles of the solid catalyst system (CS), wherein during the process no carrier material is added.

2. The process according to claim 1, wherein said organometallic compound (C) is of formula (I)

$(L)_m R_n MX_q$           (I)

wherein

"M" is a transition metal (M) of group 3 to 10 of the Periodic Table (IUPAC 2007), each "X" is independently a mono anionic ligand, like a σ-ligand, each "L" is independently an organic ligand which coordinates to the transition metal "M", "R" is a bridging group linking said organic ligands (L), "m" is 1, 2 or 3, "n" is 0, 1 or 2, "q" is 1, 2 or 3, and m+q is equal to the valency of the transition metal (M).

3. The process according to claim 1, wherein the mol-ratio between the aluminum (Al) of the aluminoxane (A) and the transition metal (M) of the organometallic compound (C) [(Al)/(M)] is in the range of 50 to 600.

4. The process according to claim 1, wherein the organosilicon compound (OS) is selected from the group consisting of octamethyltrisiloxane, decamethyltetrasiloxane, octamethylcyclotetrasiloxane, methoxytrimethylsilane, tetraethoxysilane and 1,1,1,3,5,5,5-heptamethyl-3-phenyltrisiloxane.

5. The process according to claim 1, wherein (a) the aromatic compound (AC) is toluene; and/or (b) the saturated aliphatic compound is selected from the group consisting of n-pentane, n-hexane, n-heptane, n-octane, and mixtures thereof.

6. The process according to claim 1, wherein (a) step (i) is accomplished at a temperature in the range of −20 to 70° C., and (b) step (ii) is accomplished at a temperature in the range of 0 to 50° C.

7. The process according to claim 1, wherein the organometallic compound (C) is of formula (II)

$(L)_2 RMX_2$           (II)

wherein

"M" is zirconium (Zr) or hafnium (Hf), each "X" is independently selected from halogen, $C_1$ to $C_6$ alkyl, $C_5$ to $C_6$ cycloalkyl, $C_1$ to $C_6$ alkoxy, phenyl and benzyl groups, each "L" is independently a cyclopentadienyl, indenyl, tetrahydroindenyl, or fluorenyl, which is independently substituted or unsubstituted, which optionally contains one or more heteroatoms selected from groups 14 to 16 and/or is optionally substituted by halogen atom(s), and "R" is a divalent bridge selected from —R'$_2$C—, —R'$_2$Si—, wherein each R' is independently a hydrogen atom, $C_1$ to $C_{20}$ alkyl, or $C_3$ to $C_{10}$ cycloalkyl.

8. The process according to claim 2, wherein the mol-ratio between the aluminum (Al) of the aluminoxane (A) and the transition metal (M) of the organometallic compound (C) [(Al)/(M)] is in the range of 50 to 600.

9. The process according to claim 2, wherein the organosilicon compound (OS) is selected from the group consisting of octamethyltrisiloxane, decamethyltetrasiloxane, octamethylcyclotetrasiloxane, methoxytrimethylsilane, tetraethoxysilane and 1,1,1,3,5,5,5-heptamethyl-3-phenyltrisiloxane.

10. The process according to claim 2, wherein (a) the aromatic compound (AC) is toluene; and/or (b) the saturated aliphatic compound is selected from the group consisting of n-pentane, n-hexane, n-heptane, n-octane, and mixtures thereof.

11. The process according to claim 2, wherein (a) step (i) is accomplished at a temperature in the range of −20 to 70° C., and (b) step (ii) is accomplished at a temperature in the range of 0 to 50° C.

12. The process according to claim 2, wherein the organometallic compound (C) is of formula (II)

$(L)_2 RMX_2$           (II)

wherein

"M" is zirconium (Zr) or hafnium (Hf), each "X" is independently selected from halogen, $C_1$ to $C_6$ alkyl, $C_5$ to $C_6$ cycloalkyl, $C_1$ to $C_6$ alkoxy, phenyl and benzyl groups, each "L" is independently a cyclopentadienyl, indenyl, tetrahydroindenyl, or fluorenyl, which is independently substituted or unsubstituted, which optionally contains one or more heteroatoms selected from groups 14 to 16 and/or is optionally substituted by halogen atom(s), and "R" is a divalent bridge selected from —R'$_2$C—, —R'$_2$Si—, wherein each R' is independently a hydrogen atom, $C_1$ to $C_{20}$ alkyl, or $C_3$ to $C_{10}$ cycloalkyl.

* * * * *